US 6,317,712 B1
Nov. 13, 2001

(54) METHOD OF PHONETIC MODELING USING ACOUSTIC DECISION TREE

(75) Inventors: Yu-Hung Kao; Kazuhiro Kondo, both of Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/235,031

(22) Filed: Jan. 21, 1999

Related U.S. Application Data

(60) Provisional application No. 60/073,516, filed on Feb. 3, 1998.

(51) Int. Cl.[7] .................................................. G10L 15/14
(52) U.S. Cl. ............................................. 704/256; 704/257
(58) Field of Search .................................. 704/256, 257, 704/251, 254, 255, 209

(56) References Cited

U.S. PATENT DOCUMENTS

| | | | |
|---|---|---|---|
| 5,388,183 | * | 2/1995 | Lynch .................................. 704/242 |
| 5,745,649 | * | 4/1998 | Lubensky ............................ 704/232 |
| 5,794,197 | * | 8/1998 | Alleva et al. ....................... 704/255 |
| 5,812,975 | * | 9/1998 | Komori et al. ..................... 704/256 |
| 6,006,186 | * | 12/1999 | Chen et al. ......................... 704/254 |

OTHER PUBLICATIONS

ICASSP–93. Alleva et al., "Predicting unseen triphones with senones" PP 311–314, vol. 2. Apr. 1993.*
ICSLP 96. International Conference on Spoken Language, 1996. Aubert et al., "A bottom–up approach for handling unseen triphones in vocabulary continuous speech recognition" PP 14–17 vol. 1. Oct. 199.*

* cited by examiner

Primary Examiner—Richemond Dorvil
(74) Attorney, Agent, or Firm—Robert L. Troike; Frederick J. Telecky, Jr

(57) ABSTRACT

Phonetic modeling includes the steps of forming triphone grammars (11) from phonetic data, training triphone models (13), clustering triphones (14) that are acoustically close together and mapping unclustered triphone grammars into a clustered model (16). The clustering process includes using a decision tree based on the acoustic likelihood and allows sub-model clusters in user-definable units.

11 Claims, 1 Drawing Sheet

METHOD OF PHONETIC MODELING USING ACOUSTIC DECISION TREE

This application claims benefit of provisional application no. 60/073,516, filed Feb. 3, 1998.

FIELD OF INVENTION

This invention relates to phonetic modeling of speech and more particularly to phonetic modeling using acoustic decision trees.

BACKGROUND OF INVENTION

Although there are very few phones in a language, modeling those few phones is not sufficient for speech recognition purpose. The coarticulation effect makes the acoustic realization of the same phone in different context very different. For example, English has about 40 to 50 phones, Spanish has a little more than 20 phones. Training only 50 phonetic models for English is not sufficient to cover all the coarticulation effects. Context-dependent models are considered for the speech recognition purpose because of this reason. Context-dependent phonetic modeling has now become standard practice to model variations seen in the acoustics of a phone caused by phonetic context. However, if only immediate contexts are considered, there are $50^{30}$= 125,000 models to be trained, this large number of models defeats the motivation of using phonetic models in the first place. Fortunately, some contexts will result in large acoustic difference, some will not. Therefore, the phonetic models can be clustered to not just reduce the number of models but also increase the training robustness.

The art of figuring out how to cluster phonetic models is one of the core research areas in the speech community for large vocabulary speech recognition. The clustering algorithm needs to achieve the following three goals: 1) maintaining the high acoustic resolution while achieving the most clustering, 2) all the clustered units can be well trainable with the available speech data and 3) being able to predict unseen contexts with the clustered models. Decision tree clustering using phonological rules has been shown to achieve the above objectives. See for example D. B. Paul, "Extensions to Phone-state Decision-tree Clustering: Single Tree and Tagged Clustering," Proc. ICASSP 97, Munich, Germany, April 1997.

Previously, applicant reported on FeaturePhones, a phonetic context clustering method which defines context in articulatory features, and clusters the context at the phone level using decision trees. See Y. H. Kao et al. "Toward Vocabulary Independent Telephone Speech Recognition," ICASSP 1994, Vol. 1, pgs. 117–120 and K. Kondo et al. "Clustered Interphase or Word Context-Dependent Models for Continuously Read Japanese," Journal of Acoustical Society of Japan, Vol. 16, No. 5, pgs. 299–310, 1995. This proved to be an efficient clustering method when the training data was scarce, but was too restrictive to take advantage of significantly more training data.

SUMMARY OF INVENTION

In accordance with one embodiment of the present invention, a method of phonetic modeling that applies a decision tree algorithm to an acoustic level by the steps of training baseform monophone models, training all triphone models present in the training corpus, with monophone as seeds for each center phone, splitting the root node into two descendant nodes, repeating the splitting procedure on all leaf and clustering the leaves of tree or averaging the models in the cluster to obtain seed models for each cluster.

DESCRIPTION OF PREFERRED EMBODIMENTS OF THE PRESENT INVENTION

Figure 1:
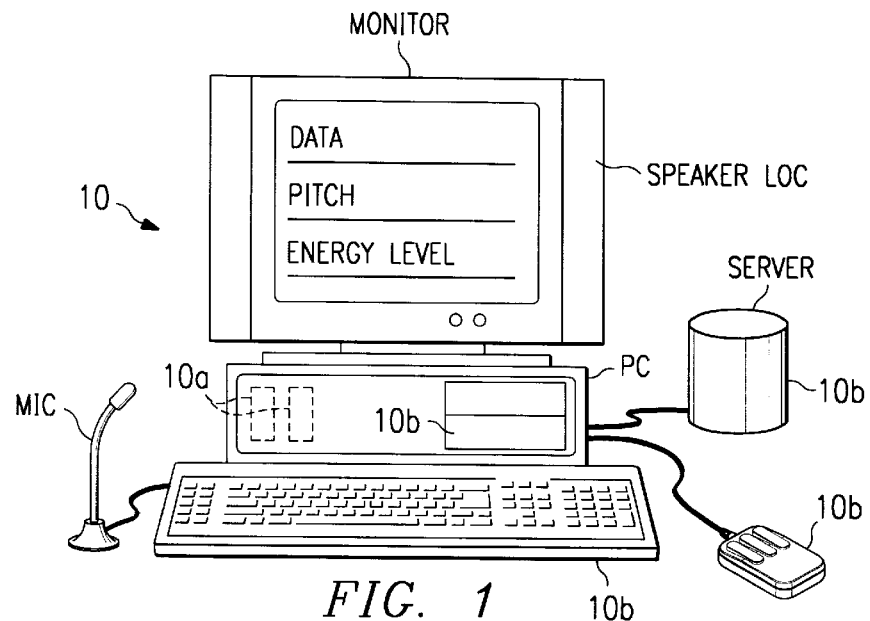
FIG. 1 is a sketch of a Speech Development Station.
Figure 2:
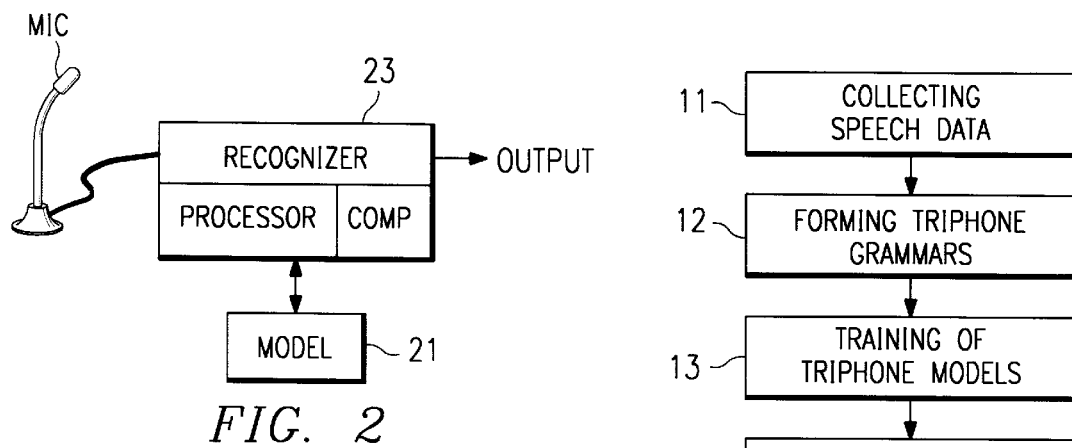
FIG. 2 illustrates a recognizer.
Figure 3:
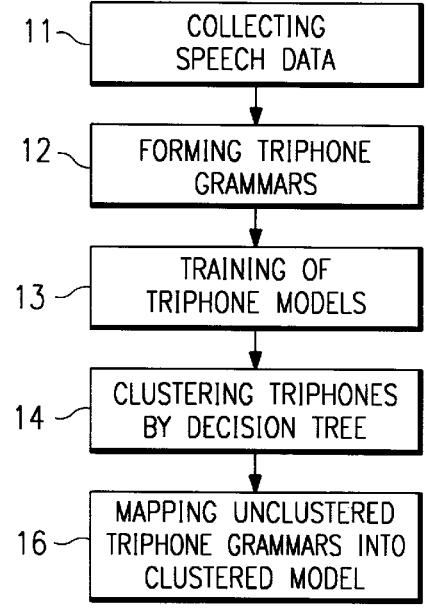
FIG. 3 is a flow chart of the method according to one embodiment of the present invention.

Referring to FIG. 1 there is illustrated a Speech Development Station 10 which may be a workstation with a personal computer (PC). The PC includes a processor and a display and inputs such as a keyboard 106, a mouse 106, a microphone, CD-ROM drive, a server and a disk drive. The inputs include speech data and software for performing the process steps. The process performed by the software steps to follow generates a phonetic model. This model 2 in turn is used in a speech recognizer 23 including a processor 23 and a comparator 23 as shown in FIG. 2 to recognize incoming speech from a microphone (MIC). Speech features are classified as discussed below with a few examples:

- Vowel/Consonant
    front/back,        high/low
    iy eh/ ao aa uh,    iy uh/aa
- Voiced/Unvoiced
    b/p, d/t, g/k, v/f, z/s
- Place
    bilabial, labiodental,dental,alveolar, palatal, velar, glottal
    b p m w, vf ,th dh , t d s z n l, ch sh zh jh, k g ng, h
- Manner
    obstruent, sonorant, stop, fricative, affricate, strident, nasal, liquid, glide
    b w,   m l w r. b d g. f v th sh. ch jh.   f v s ch.   m n ng. lr. wy Referring to FIG. 3 there is illustrated a flow chart illustrating the steps taken according to one embodiment of the present invention. The first step 11 is collecting speech data from many speakers to cover all accents. In a preferred embodiment several corpora were combined. They are for telephone channel corpora, Voice Across America (VAA), Macrophone and Phonebook. The VAA corpus has digits, commands and TIMIT sentences. TIMIT stands for Texas Instruments & MIT (University) who designed the sentence set. They are phonetically balanced sentences. This has been collected by Texas Instruments between 1988 and 1992. The TIMIT sentences have 5,222 utterances. The Macrophone corpus has digits, name and phonetic sentences. The sentences are from TIMIT, ATIS (Air Travel Information System) and WSJ (Wall Street Journal). This was collected at Stanford Research Institute (SRI) around 1994, available through LDC (Linguistic Data Consortium). The phonetic sentences in training sets were used. There are 22,617 utterances. The Phonebook has single word utterances. There are about 8,000 different words designed to be phonetically balanced. Collected at NYNEX, available through LDC. All utterances in training set were used. There are 77,710 utterances. There are totally 105,549 utterances. They are all collected through telephone channel. The vocabulary size of the combined corpus is 15,314 for male, 16,049 for female. Within-word triphone count is 29,039.

For microphone channel corpora there are Resource Management (4,200 utterances in training set), TIMIT 13,696 utterances) and Wall Street Journal (WSJ) which has 26,733 utterances in training set. These corpora are all available through LDC. There are totally 34,629 utterances. The vocabulary size of the combined corpus is 16,165. The within word triphone count is 26,714.

The next step 12 is creating triphone grammars. Training is done by supervised alignment. Supervision can be done in two ways. You can use either Length-constrained grammar guided by supervision word string, or create a sentence grammar for each training utterance. Length-constrained grammar is much smaller than creating individual sentence grammar. However, it has a severe computation overhead, especially for large vocabulary job. Therefore, we used individual sentence grammar for each training utterance. The size is huge, but as long as you have the memory to handle it, it is much faster.

Because the clustering is based on triphone, we have to create triphone pronunciations grammars. These are within word triphones.

Cross word triphones can achieve up to 30% error rate reduction compared to within word triphone. Training software as well as recognition software need extensive upgrade to handle cross word triphone.

After all the grammars are created, seed all the triphone models from monophone models.

The next step 13 is training of triphone models from triphone grammars using data in corresponding triphone grammars. Applicants did the usual two passes in acoustic only update, three pass both acoustic and transition probability in HMM structure update for triphone training.

Because many of the triphones have low training count, Hidden Markov Models (HMMs) can not be trained properly. HMMs need a lot more training than acoustic means. For example, if you have 10 training tokens, the acoustic means will be pretty well trained; but the HMM will be very bad. The HMM will have many missing transitions, especially for finite duration models where there are a large number of transitions.

Applicants teach to tie triphone HMMs. Speech recognition is known to be dominated by acoustic matching, HMM structures of phonetic models have negligible effect on recognition. Speech modeling lies in large number of acoustic mixtures.

Figure 4:
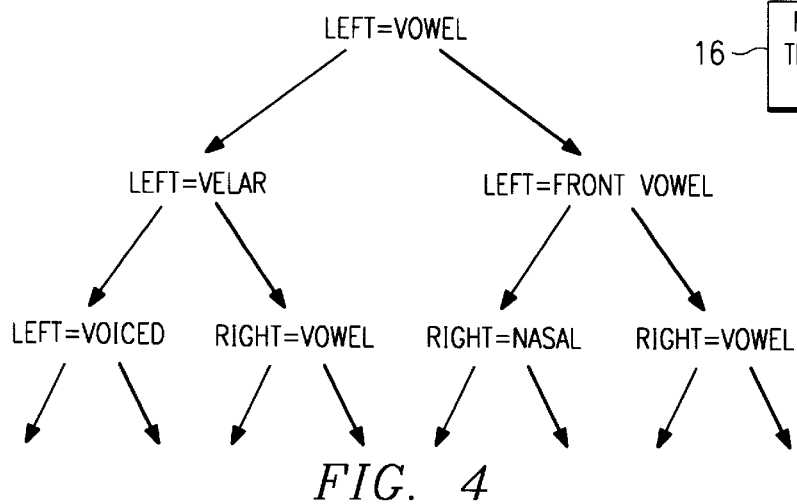
FIG. 4 illustrates a decision tree according to the present invention.

The next step 14 is clustering triphones by a decision tree with left/right questions based on triphone acoustics. For each sub-model unit per center phone, start with all models. Apply split context questions and select the questions which gives the best split according to the given criteria. The decision tree algorithm collects all triphones with the same center phone in the root node of the tree. The split context questions are phonological questions to split the root into two descendant nodes where one answer is "yes" and the other answer is "no" to the questions as illustrated in FIG. 4 starting left=vowel. The path to the right is for a "yes" answer and the path to the left is for a "no" answer. This is done recursively on all the leaf nodes until the desired number of clusters is reached. Each leaf node is a cluster consisting of possibly many triphones. One model is built for each cluster. After the trees are built, any triphone (including unseen) can be classified by traversing down to one cluster.

The size of our phonetic models are based on the nominal length of monophones. For example, diphthong /oy/ is three times the size of schwa /ax/, so the temporal course of the formant can be modeled adequately. Left portion of the model should be affected more by left contexts, right portion of the model should be affected more by right contexts. While model clustering does not take full advantage of the power of left/right questioning. Flexible sub-model partition allows decision trees for sub-models to be built. The results do show that the questions in decision trees are heavily sided: left questions were chosen more often in left sub-model trees; right questions were chosen more often in right sub-model trees.

On one end of the spectrum is whole model clustering, which does not take advantage of the left/right dependency as explained in previous paragraph. On the other end of the spectrum is state clustering, which gives each model state its own decision tree. For example, diphthong /oy/ has 9 states, that means we need to create 9 decision trees for state 1, state 2, state 3, etc. independently. This will make the decision trees susceptible to acoustic estimation noise. Grouping of adjacent states for clustering will make the trees more robust. Accordingly, applicants allow the clustering unit to be in arbitrary sub-model units, typically 3 units per phone.

We have compared whole model clustering and approximate ⅓ sub-model clustering, the ⅓ sub-model clustering achieved more than 10% of error rate reduction. Flexible grouping is very important in that any grouping can be tested in order to reach the best balance between decision tree resolution and estimation robustness.

flexible grouping is necessary in some cases. For example, our /t/ model is concatenated by stop and burst. HMM transitions are provided for late entry into burst and early exit from stop. Some realizations of /t/ have only stop, some only burst, some both. The acoustics in stop are mostly low energy; while the acoustics in burst are mostly high energy and capture the formant structure of the following vowel. Separate decision trees are created for stop and burst portions of /t/. Grouping is typically 3 groups per phone.

Following is an example tree file. It has the list of questions at the beginning. Questions are defined by name followed by regular expression. For example, /b/ /d/ /g/ /p/ /t/ /k/ are stops, the questions are defined simply by specifying them in the regular expression. Because the trees are defined by questions names only, it needs the question definition to be self-explanatory. This list of questions is exactly the same as the list you input. It is followed by all the trees. Here we look at the trees for male /l/.

```
QS L__Class-Stop g_*_* k_*_* d_*_*
   t_*_* b_*_* p_*_* END
QS R__Class-Stop *_*_g *_*_k *_*_d
   *_*_t *_*_b *_*_p END
...
TREE = 1__m[1 1]
L__Vowel = T
|    L__V-Front = T
|    |    LEAF = 1__ii__m
|    L__V-Front = F
|    |    R__Vowel = T
|    |    |    LEAF = 1__12__m
|    |    R__Vowel = F
|    |    |    LEAF = 1__13__m
L__Vowel = F
|    L__Fortis = T
|    |    LEAF = 1__14__m
|    L__Fortis = F
|    |    L__UnFortLenis = T
|    |    |    LEAF = 1__15__m
|    |    L__UnFortLenis = F
```

```
                    |    |    |         LEAF = 1__16__m
         TREE = 1__m[2 2]
         R__Vowel = T
         |    L__Sil = T
         |    |    LEAF = 1__21__m
         |    L__Sil = F
         |    |    R__High = T
         |    |    |    LEAF = 1__22__m
         |    |    R__High = F
         |    |    |    L__Fortis = T
         |    |    |    |    LEAF = 1__23__m
         |    |    |    L__Fortis = F
         |    |    |    |    LEAF = 1__24__m
         R__Vowel = F
         |    L__V-Front = T
         |    |    LEAF = 1__25__m    100
         |    L__V-Front = F
         |    |    LEAF = 1__26__m    130
         TREE = 1__m[3 3]
         R__Vowel = T
         |    R__iy = T
         |    |    LEAF = 1__31__m    40
         |    R__iy = F
         |    |    R__V-Back = T
         |    |    |    LEAF = 1__32__m
         |    |    R__V-Back = F
         |    |    |    LEAF = 1__33__m
         R__Vowel = F
         |    R__Voiced-cons = T
         |    |    LEAF = 1__34__m
         |    R__Voiced-cons = F
         |    |    R__Fortis = T
         |    |    |    LEAF = 1__35__m
         |    |    R__Fortis = F
         |    |    |    LEAF = 1__36__m
         . . .
```

The trees are in indented pretty print, pre-order list. TRUE and FALSE branches are aligned for easy reading. The above trees are for male monophone /l/. TREE=$1\_m[3\ 3]$ means it is for phone $1\_{m\ frame}$ 3 (from frame 3 to frame 3). LEAF node specifies the cluster name. The cluster name index is prefixed by the first name index of this cluster group, followed by a sequential number, starting from 1.

From these example trees, we can see clearly that questions are heavily sided. Left questions are used more often for frame 1 (left frame), rights questions are used more often for frame 3 (right frame). The first question for all 3 trees is: Whether the left (or right) phone is a vowel or not? The earlier a question is asked in the decision tree, the more important it is. When /l/ precedes a vowel within a syllable, it is a light /l/; when /l/ follows a vowel within a syllable, it is a dark /l/. The decision tree picks the exact best question to discriminate light and dark /l/ as the most important question.

Two criteria to decide the best question for splitting a tree node were tested: entropy reduction based on training count and likelihood improvement based on acoustic vectors. We found that acoustic likelihood provides better performance.

The entropy reduction criterion is based on training count. Entropy, $\epsilon$, of a tree node is computed as:

$$\varepsilon = \sum_{i=1}^{n} -P_i \log P_i$$

where n is the number of different triphone models in the tree node. Pi is the probability of model i in the node. Entropy reduction after a split is defined as:

$$\Delta\epsilon = N_p\epsilon_p - N_y\epsilon_y - N_n\epsilon_n$$

where $N_p = N_y + N_n$, they represent the training count of the parent node (before the split), and the training counts of the yes node and no node (after the split, some of the models will be assigned to the yes node, others to the no node). All the questions will be tried to split a node, and their corresponding entropy reductions computed. The question that produces the largest entropy reduction will be chosen to split the node.

Entropy represents the pureness of the node. If, for example, there is only one triphone in the node, the entropy will be zero (which is what we want). On the other hand, large entropy means the node has a great variety of different contexted triphones, which is undesirable. Choosing largest entropy reduction means that the question will split for the best separation of triphones. Note that the entropy reduction is weighted by the training count in order to guarantee that entropy will reduce after any split.

The entropy reduction criterion will build the tree by choosing best questions for best separation of triphones (i.e. ranking the importance of the questions). The more important questions will be chosen first. The fact that entropy is weighted by training counts also insures to some degree that all the final clustered nodes will have enough training count.

The problem with entropy reduction criterion is that the measure does not use the acoustic vector directly. Although it will build a tree for the best separation of triphones, it does not know how close the triphones are within a cluster node. That is the main objective of clustering—to cluster the triphones that are acoustically close together.

The acoustic likelihood improvement criterion is defined to achieve this objective. The compactness of a cluster (tree node) is computed directly using the acoustic vectors.

The likelihood of a tree node is computed as:

$$L = \sum_{i=1}^{n} (\vec{\mu}_i - \vec{c})^2$$

where n is the number of different triphone models in the tree node, $\vec{\mu}$ is the mean of each triphone Gaussian distribution. $\vec{c}$ is the centroid vector from averaging all the Gaussian means of all the triphone models in this tree node. The temporal (frame) index of the Gaussian distributions within a model was omitted for brevity. The temporal index does have to be maintained in the likelihood computation. For example, diphthong /oy/ has 9 sequential acoustic vectors in the model. In computing the above likelihood, centroid, $\vec{c}$, is also 9 vectors. The distance computation between $\vec{\mu}$ and $\vec{c}$ also maintains the temporal index. Because there is big difference between the $1^{st}$ vector (like /ao/) and the $9^{th}$ vector (like /iy/) of model /oy/, it does not make sense to compute the distance between frame 1 and 9. Variance normalization was also omitted in the above equation, it should be added if the vectors have not already been normalized.

The above likelihood definition is really −log of Gaussian probability, conceptually it is more like error, the smaller the better. A small L means the cluster is very compact, which is desirable. A question will split the node into two nodes (yes and no. We define the error reduction (likelihood improvement) as:

$$\Delta L = L_r - L_y - L_n$$

Like in the entropy reduction criterion, the above definition can be weighted by training counts. Linear weighting will guarantee ΔL to be positive for any split:

$$L = \sum_{i=1}^{n} N_i (\vec{\mu}_i - \vec{c})^2$$

However, there exists a huge difference between the training counts of different triphones. Although the training corpora are designed to be phonetically balanced, the frequent triphones' training counts are overwhelmingly large compared to some less frequent triphones. A likelihood definition weighted by training counts linearly will neglect these out-numbered triphones and favor the frequent triphones. The infrequent triphones may have distinctive features worthy of preserving. Therefore, we have also tested log weighting:

$$L = \sum_{i=1}^{n} (\log N_i)(\vec{\mu}_i - \vec{c})^2$$

log weighting is designed to reduced the influence of frequent triphones in order to preserve infrequent and acoustically distinctive triphones.

We have also tested no training count weighting, which give each triphone the same voting power regarding choosing the best split.

The results showed that no training count weighting is worse, while linear weighting and log weighting achieve similar performance.

The likelihood improvement criterion gives more than 10% error rate reduction compared to entropy reduction criterion.

Gaussian mixture densities were added after all the ADT clustered models are trained up with single mixtures. Since there are a large number of clusters, we chose to incrementally create multiple mixtures by splitting the means, seeding the means by adding and subtracting a perturbation proportional to the standard deviation.

Mixture density functions are known to improve performance especially for speaker-independent speech recognition since the vocal tract characteristics differ significantly by speaker, not to mention gender. Mixtures also can potentially model modalities other than vocal tract characteristics, e.g. speaking-style and coarticulation effect. By introducing context-dependent phones, we are trying to normalize the multi-modalities caused by coarticulation, and thus reducing the modalities which mixtures need to model. The same goes for gender-dependent modeling.

Since not all context introduced modalities in different ways, we try to cluster context in which we think will have the same mode into one cluster. This is essentially what is done in ADT clustering. Obviously this is a simplification, and even the same context may still show significant degree of modality, not to mention modalities caused by conditions other than context. If there are too few clusters allocated to model context for a given phone, then the modalities within the cluster will increase accordingly. By introducing mixture density functions, we attempt to model these modalities left behind normalization by context clustering.

Since mixture density functions increase the number of free parameters, the amount of training required to train these parameters reliably increase accordingly. Diagonal covariance metrics is commonly used with mixture densities instead of full covariance metrics especially with phonetic models to maintain the required training data within manageable amount. Rare phone combinations may still not have enough training instances to train mixture density functions reliably. Clustering these rare combinations with similar combinations can potentially mitigate this problem.

Thus, modeling of modalities using these mechanisms is always a tug of war between the amount of training data available, the number of mixture densities introduced per model/state, and the degree to which we cluster each phonetic context. For training data, we will use all we have available; this will be explained later. Thus this is a fixed variable. We have conducted experiments with different combinations of number of clusters and mixture densities to come up with the optimum operating point.

Since we are targeting a speaker-independent system, we must assume a variety of conditions not only in speaker characteristics, but also input device, surrounding noise, and channel characteristics. All these variations (except speaker) can be roughly approximated as slow mean deviations. Thus, we can expect to improve the performance by estimating this mean and subtracting them from the input. This can not only improve recognition, but also training. Since the training data is pooled from a large number of conditions, normalizing these can sharpen the acoustics of the trained models.

There are a number of ways to estimate the mean of the input. However, in order to obtain this estimate in real time, we need to calculate the estimates as input speech comes in instead of waiting until the whole utterance is input. Thus we calculate the mean cumulatively. We start with an initial estimate of the mean, typically mean over the whole training corpus. This mean is updated with the cumulative mean for each input speech frame. This mean is subtracted from the input speech, both during training and recognition.

In order to fully model the coarticulation effect, we not only need to separately model context within words, but also between words. However, this is not as straightforward as in the within-word case. There are two problems to model inter-word context.

First, there is possibility for the speaker to pause between words. Since pause is also a context, these must be modeled separately from instances where the words are read continuously without pauses as they typically differ in term of coarticulation effect.

Normally, during training, we supervise the sequence of phones according to the transcription provided with the corpus. This includes the inter-word context. However, there are very few training corpora which have inter-word pauses explicitly transcribed. Thus, it is necessary to automatically detect pauses, and supervise context according to the detected result. The following example grammar will accomplish this.

```
Start (<S>).
<S> --> _silence, <S>.
<S> --> bbb_w_ah, Z_1.
Z_1 --> w_ah_n, Z-2.
Z_2 --> ah_n_bbb, Z_3.
Z_2 --> ah_n_t, Z_5.
Z_3 --> _silence, Z_4.
Z_4 --> _silence, Z_4.
Z_5 --> bbb_t_uw, Z_6.
Z_6 --> t_uw_bbb, Z_7.
Z_7 --> _silence, Z_7.
Z_7 --> " ".
```

The above is an example grammar for supervision of phonetic sequence for the sentence "one two." Here, "_silence"

is the silence model, and "x_y_z" is a phonetic model for phone y with phones x and z as its left and right phonetic context respectively. The "bbb" context stands for the silence context. Between the phone sequence of "one(w, ah, n)" and "two(t uw)", the grammar allows both a path through silence, forcing the inter-word context for silence, and direct path without silence, forcing direct inter-word phonetic context. Ideally, the recognizer will be accurate enough to select the first path when there is actually a inter-word pause, and the second path if not. We found this to work fairly well, with reasonable automatic paths selections conforming to subjective pauses.

The recognition may not be as straightforward as training. Unlike training, any word may have multiple words preceding and succeeding. This will mean multiple inter-word context is required, both at the word beginning and end. Thus, we need a mechanism to select the appropriate grammar according to the preceding context. This may not be a trivial function to incorporate. However, word n-grams, commonly used in large vocabulary speech recognition, will work very well with inter-word context. Since n-grams will distinguish word hypothesis with past N hypothesis, we can create word to phone with the exact inter-word context for each history of n words.

The second problem we encounter is that there generally is significant increase in number of context-dependent phonetic models required to model inter-word context. Texas Instruments has found that to model Japanese digit strings using inter-word context-dependent phonetic models, there is a five-fold increase in the number of triphone models required compared to models required when inter-word context is ignored. See Kondo et al. article in Journal of the Acoustical Society of Japan (E), Vol. 16, No. 5, pp. 299–310, 1995 entitled "Clustered Interphrase or Word Context-Dependent Models for Continuously Read Japanese." For English, Hwang et al. reported the model increase is three-fold for the 997-word DARPA resource management task. See Hwang et al. article in Eurospeech 1989, pp. 5–8 entitled "Modeling Between-Word Coarticulation in Continuous Speech Recognition."

English makes use of differences in stress more than other major languages. Stress sounds are pronounced with more energy. Thus they are louder. Stress is one of the prosodic features of speech. These features are not independent of each other; they are highly correlated. Stressed sounds also tend to have longer durations, and their pitch tend to rise. Thus, their acoustical characteristics will differ from unstressed sounds. Therefore, it makes sense to model stressed and unstressed sounds with separate models to normalize their differences.

Stresses are considered to effect the entire syllable, rather than just individual phones. However, we chose to model only vowels with separate stressed and unstressed models for the following reasons:

Vowels can be assumed to be affected more than consonants by stress.

There are generally more occurrences of vowels than consonants. Thus, we can afford to divide training data for vowels, but not for at least some of the rare consonants.

We used two levels of stress for vowels; primary stress, and secondary and on-stressed. The context was not defined using stress; in other words, we did not distinguish stressed and unstressed vowels for phonetic context. All these were to avoid dividing the training data too excessively.

After the frames are clustered, the next step 16 is to map unclustered triphone grammars into the clustered model.

What is claimed is:

1. A method of performing speech recognition comprising the steps of: generating phonetic models comprising the steps of forming triphone grammars from phonetic data; training triphone models; clustering triphones that are acoustically close together to form clustered triphone model by an acoustic decision tree analysis; and mapping unclustered triphone grammars into a clustered model; and recognizing input speech by comparing said input speech to said clustered triphone model.

2. The method of claim 1 wherein said clustering step has flexible submodel grouping of cluster sizes.

3. The method of claim 2 wherein said sub-model grouping is based on the class of phone in which said grouping reside.

4. The method of claim 1 wherein said clustering is a likelihood improvement criterion.

5. The method of claim 1 wherein said clustering triphones clusters said triphones such that the cluster size per phone is based on the entropy of the phone.

6. The method of claim 1 wherein the clustering triphones includes division of the phone class into clusters based on acoustic likelihood.

7. The method of claim 1 wherein the clustering is based on the weight of the acoustic likelihood calculation by the entropy of the cluster in question.

8. The method of claim 7 wherein said decision tree analysis includes decision criteria based on regular expression as a pattern match.

9. A speech recognition system comprising:
a microphone for receiving speech;
a clustered model from clustering triphones that are acoustically close together; and
a processor including a comparison means coupled to said microphone and said clustered model and responsive to said speech received for comparing incoming speech to said clustered model to provide a given output when there is a compare.

10. The recognition system of claim 9 wherein said clustering triphones that are acoustically close together is by clustering by an acoustic decision tree analysis.

11. A speech recognition system comprising:
a clustered model from clustering triphones according to the steps of:
collecting speech data, forming triphone grammars, clustering triphones that are acoustically close together and clustering triphones by decision tree analysis wherein the decision criteria is on likelihood improvement based on acoustic vectors; and
a speech recognizer for comparing said incoming speech to said clustered model for recognizing speech.

* * * * *